United States Patent
Deen et al.

(10) Patent No.: US 11,330,067 B1
(45) Date of Patent: May 10, 2022

(54) SYSTEM, METHOD, AND COMPUTER PROGRAM FOR A PLATFORM MANAGING SERVICE PROVISIONING FOR A COMMUNICATION SERVICE PROVIDER (CSP) AND DIGITAL CONTENT PARTNER INTEGRATION

(71) Applicant: Amdocs Development Limited, Limassol (CY)

(72) Inventors: Jay Deen, Toronto (CA); Francis Kim, Toronto (CA); Eric Chen, Toronto (CA); Saad Naji, Toronto (CA)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/987,233

(22) Filed: Aug. 6, 2020

(51) Int. Cl.
*H04L 67/51* (2022.01)
*H04W 4/24* (2018.01)
*H04L 41/50* (2022.01)
*H04L 67/10* (2022.01)

(52) U.S. Cl.
CPC .......... *H04L 67/16* (2013.01); *H04L 41/5096* (2013.01); *H04L 67/10* (2013.01); *H04W 4/24* (2013.01)

(58) Field of Classification Search
CPC ............................. H04L 41/5096; H04W 4/24
USPC ......................................................... 370/329
See application file for complete search history.

(56) References Cited

U.S. PATENT DOCUMENTS

| | | | | |
|---|---|---|---|---|
| 2002/0035605 | A1* | 3/2002 | McDowell | H04L 51/04 709/206 |
| 2012/0089521 | A1* | 4/2012 | Abrevaya | H04M 15/00 705/75 |
| 2014/0150123 | A1* | 5/2014 | Alsina | G06F 21/10 726/33 |

OTHER PUBLICATIONS

Sharma, Getting started with Oracle Database 12c Multitenant Architecture, red-gate.com, Feb. 22, 2017 (9 pages) (Year: 2017).*
Brim, 8 Key Provisions to Include in Your Partnership Agreement, brimlaw.com, Aug. 31, 2017 (7 pages) (Year: 2017).*

* cited by examiner

*Primary Examiner* — Wing F Chan
*Assistant Examiner* — Leon Y Tseng
(74) *Attorney, Agent, or Firm* — Zilka-Kotab, P.C.

(57) ABSTRACT

As described herein, a system, method, and computer program are provided for a platform managing service provisioning for a communication service provider (CSP) and digital content partner integration. In use, a digital content partner is onboarded to a platform. Additionally, CSP is onboarded to the platform. Further, service provisioning for an integration of the CSP and the digital content partner is managed by the platform.

19 Claims, 14 Drawing Sheets

2) Carrier Managed Subscription via CSP Website
*Page 2 of 2*

Partner "Redemption" Flow

1. The customer can continue the journey on the Partner website or app
2. Once the customer registers logs in, the partner verifies the provisioned redemption code
3. Partner system updated M1 with the ACTIVE status

3) Carrier Managed Subscription (BSS)

1. The user authenticates with their CSP
2. User views available subscriptions from CSP ordering
3. User chooses bundle and submits. OMS provisions to M1. The subscription is sent to the partner with redemption code
4. The user receives a registration link to the partner service
5. Monthly transaction processing

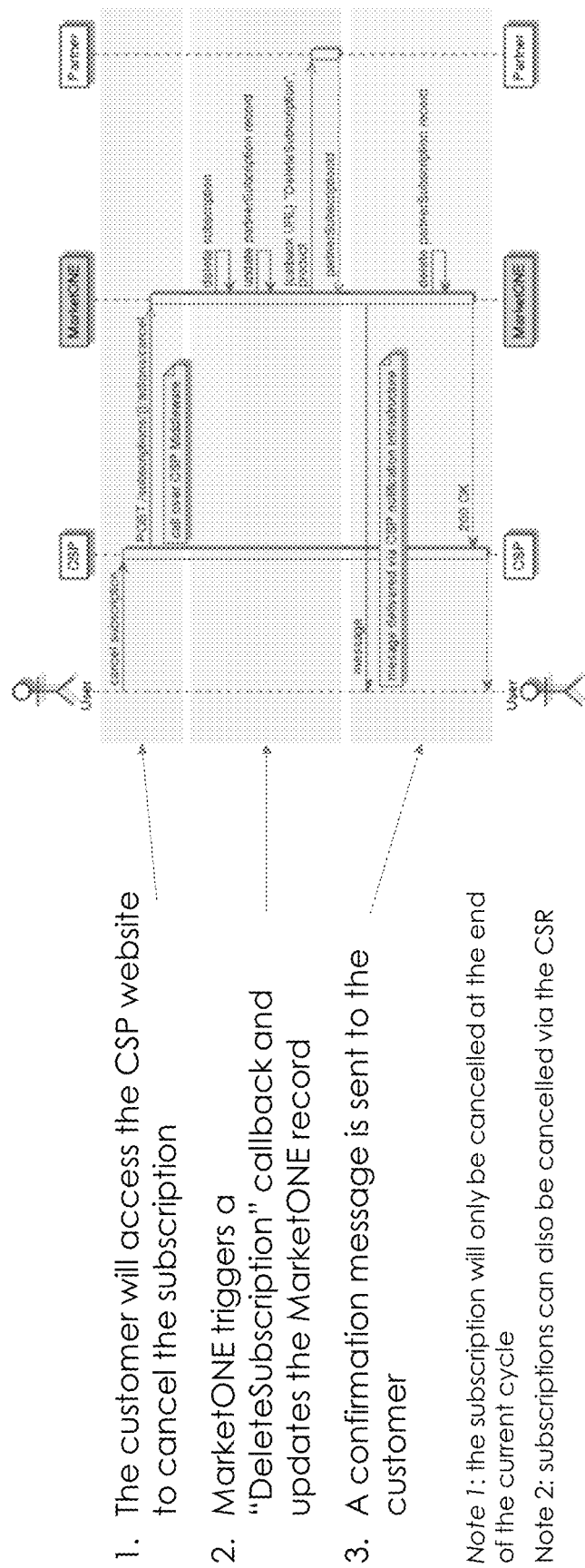

4) Cancel Carrier Managed Subscription

1. The customer will access the CSP website to cancel the subscription
2. MarketONE triggers a "DeleteSubscription" callback and updates the MarketONE record
3. A confirmation message is sent to the customer Note 1: the subscription will only be cancelled at the end of the current cycle
Note 2: subscriptions can also be cancelled via the CSR

FIG. 9

Update Carrier Managed Subscription

1. User accesses CSP website/app and sees current subscriptions
2. User updates subscription (e.g. upgrade)
3. "UpdateSubscription" callbacks from MarketONE for upgrades, downgrades
4. User is notified of change

US 11,330,067 B1

SYSTEM, METHOD, AND COMPUTER PROGRAM FOR A PLATFORM MANAGING SERVICE PROVISIONING FOR A COMMUNICATION SERVICE PROVIDER (CSP) AND DIGITAL CONTENT PARTNER INTEGRATION

FIELD OF THE INVENTION

The present invention relates to service provisioning systems.

BACKGROUND

Digital content (service) providers currently provide their digital content directly to consumers. This direct-to-consumer approach, however, has various limitations. For example, consumers are required to install on their devices a separate application for each digital content provider, each requiring separate logins, payments, profiles and preferences, which is cumbersome for consumers. On the other end, digital content providers are required to make an individual effort with regard to reaching potential consumers, as well as an individual effort to create user journeys from scratch, and further to create expensive billing, identity and activation integrations that take months.

There is thus a need for addressing these and/or other issues associated with the prior art.

SUMMARY

As described herein, a system, method, and computer program are provided for a platform managing service provisioning for a communication service provider (CSP) and digital content partner integration. In use, a digital content partner is onboarded to a platform. Additionally, CSP is onboarded to the platform. Further, service provisioning for an integration of the CSP and the digital content partner is managed by the platform.

BRIEF DESCRIPTION OF THE DRAWINGS

FIG. 9 illustrates a system flow for cancelling a platform (MarketOne) managed subscription, in accordance with one embodiment.

DETAILED DESCRIPTION

Figure 1:
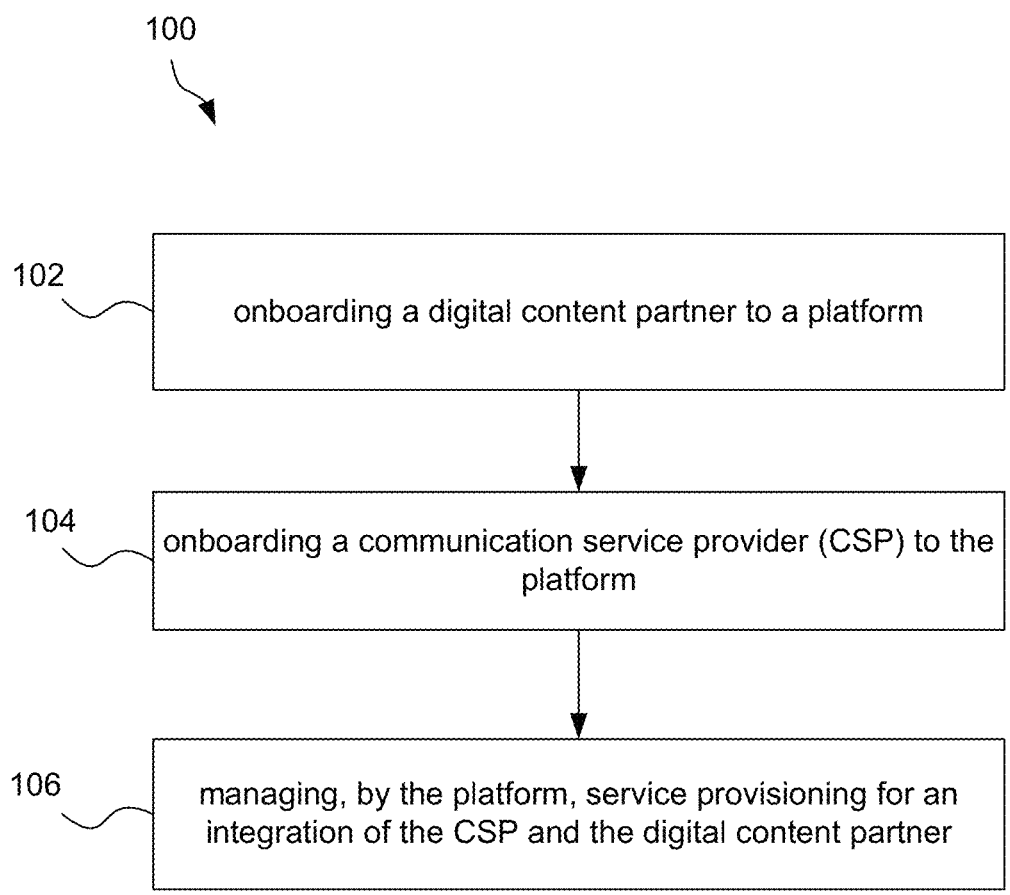
FIG. 1 illustrates a method for a platform to manage service provisioning for a communication service provider (CSP) and digital content partner integration, in accordance with one embodiment.

FIG. 1 illustrates a method 100 for a platform to manage service provisioning for a communication service provider (CSP) and digital content partner integration, in accordance with one embodiment. The method 100 is performed by the platform, as described. In the context of the present description, the platform is a combination of a computing system, such as one or more servers or other hardware computing devices (e.g. see FIGS. 12 and 13), and computer code that is executable by the computer system to perform the method 100. Further, while the method 100 is described below with reference to a particular CSP and digital content partner, it should be noted that the platform may manage service provisioning for various CSP/digital content partner integrations.

As shown, in operation 102, a digital content partner is onboarded to a platform. With respect to the present description, the digital content partner is any entity that provides at least one digital service to consumers. The digital service may be a content provisioning (e.g. streaming) service, for example. To this end, the digital content partner may host digital content or other services for consumption by consumers. In various embodiments, the digital content partner may be an over-the-top (OTT) partner.

In one embodiment, the digital content partner may be onboarded to the platform by creating an account for the digital content partner with the platform. For example, the platform may include a multi-tenant database system, in which case the digital content partner may be onboarded to the platform by creating a digital content partner organization in the multi-tenant database system for the digital content partner.

In another embodiment, the digital content partner may be onboarded to the platform by storing information associated with the digital content partner in the platform (e.g. in the digital content partner organization). For example, a catalog of digital services provided by the digital content partner may be created within the platform. As another example, information associated with an approved agreement between the digital content partner and the CSP may be stored within the platform. Optionally, the digital content partner may be onboarded to the platform using self-service user interfaces provided by the platform.

Additionally, in operation 104, CSP is onboarded to the platform. With respect to the present description, the CSP is any entity that provides a communication network for use by consumers. The CSP may also provide its own digital services to consumers.

In one embodiment, the CSP may be onboarded to the platform by creating an account for the CSP with the platform. For example, the platform may include a multitenant database system, in which case the CSP may be onboarded to the platform by creating a CSP organization in the multi-tenant database system for the CSP.

In another embodiment, the CSP may be onboarded to the platform by storing information associated with the CSP in the platform (e.g. in the CSP organization). For example, partnership models, settlement models, agreements, etc. may be created within the platform for the CSP. As another example, information associated with an approved agreement between the CSP and the digital content partner may be stored within the platform. As yet another example, settlement rules for digital services provided by the digital content partner may be created within the platform for the CSP. Optionally, the CSP may be onboarded to the platform using self-service user interfaces provided by the platform.

Further, in operation 106, service provisioning for an integration of the CSP and the digital content partner is managed by the platform. In one embodiment, the integration may be defined by the information stored within the platform for the digital content partner and CSP, such as the approved agreement therebetween, the settlement rules, etc. In any case, the integration of the CSP and the digital content partner refers to cooperation between the CSP and the digital content partner to provision a service to the consumers. In one embodiment, the integration may allow the CSP to bill the consumers for a digital service provided to the consumers by the digital content partner.

As noted above, the platform manages the service provisioning for the integration. In other words, the platform enables the cooperation between the CSP and the digital content partner to provision the service to the consumers. For example, the platform may act as an intermediary between the CSP and the digital content partner. As described below, a manner in which the platform manages the service provisioning for the integration may vary based on a type of integration between the CSP and the digital content partner.

In one embodiment, the integration may be provided through a digital content partner managed consumer subscription. The digital content partner managed consumer subscription may refer to a subscription of a consumer to a digital service of the digital content partner made directly through an interface of the digital content partner. With respect to this embodiment, the subscription may include a consumer selection of the CSP to be used for direct carrier billing (DCB). DCB refers to an OTT purchase that is made using a mobile number of a CSP customer and then billed to the CSP customer's wireless bill. Further, the service provisioning may be managed in association with the digital content partner managed consumer subscription by the platform receiving transactions of the consumer (i.e. with the digital content partner in association with the subscription), and then submitting the transactions to the CSP for the direct carrier billing by the CSP. Other embodiments are contemplated in which bill on behalf of (BOBO) is used for the consumer. BOBO refers to an OTT purchase that is made using an identifier of a device of the consumer.

In another embodiment, the integration may be provided through a platform managed consumer subscription. The platform managed consumer subscription may refer to a subscription of a consumer to a digital service of the digital content partner made through an interface of the CSP. Further, the service provisioning may be managed in association with the platform managed consumer subscription by the platform providing to the digital content partner a redemption code associated with the subscription (i.e. wherein the digital content partner uses the redemption code to verify the subscription), and submitting transactions of the consumer with the digital service to the CSP for direct carrier billing.

To this end, the platform may provide a frictionless experience for CSPs and digital content partners (providers) to bring a vast array of digital services to end users, namely by enabling integrations between various CSPs and digital content partners to provide those digital services to consumers. For example, the platform may allow digital content partners to integrate with the platform once and access an extensive CSP ecosystem. Similarly, the platform may allow CSPs to integrate with the platform once and access an extensive partner ecosystem. Further, the platform may provide data to CSPs and digital content partners for the purpose of reconciliation and/or analytics. For consumers, the platform may provide a single, consolidated location for purchasing digital services, a synchronized way of managing identity and payments across platforms, as well as a consistent experience and models to support partner offers, bundles and solutions.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
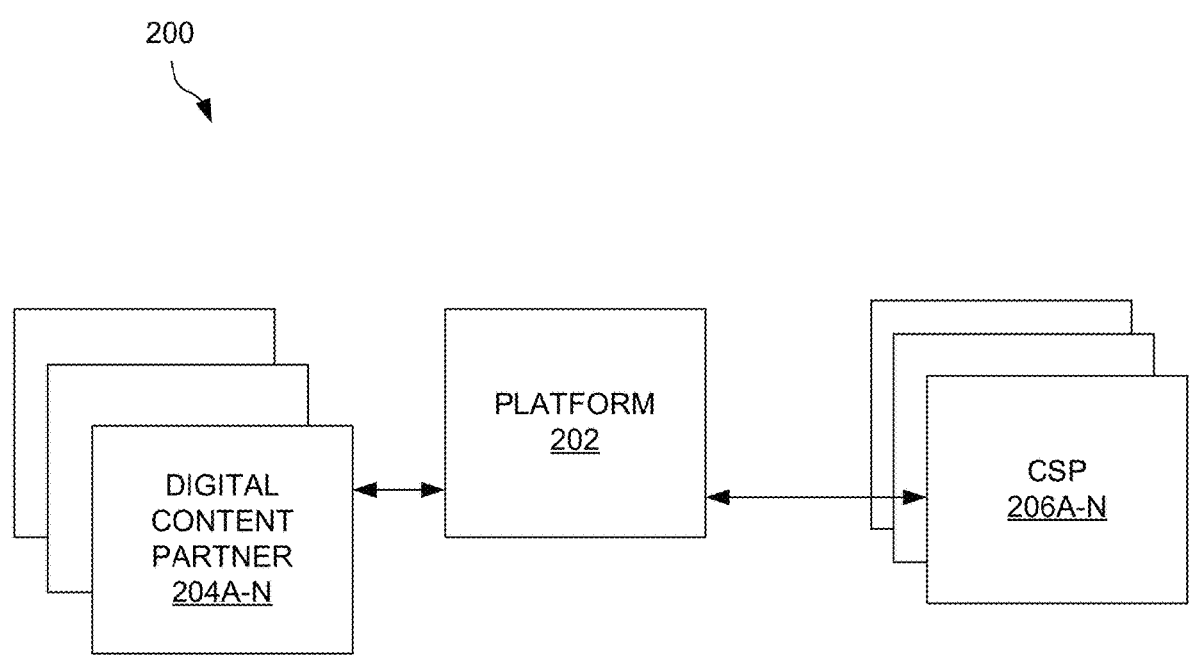
FIG. 2 illustrates a system for a platform to manage service provisioning for a CSP and digital content partner integration, in accordance with one embodiment.

FIG. 2 illustrates a system 200 for a platform to manage service provisioning for a CSP and digital content partner integration, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, a platform 202 communicates with one or more digital content partners 204A-N as well as one or more CSPs 206A-N. The platform 202 may include APIs through which the partners 204A-N communicate with the platform 202. Similarly, the platform 202 may include APIs through which the CSPs 206A-N communicate with the platform 202. API key security employed by the platform 202, as described below with respect to FIG. 5, to ensure secure communications with the digital content partners 204A-N and the CSPs 206A-N.

In operation, the platform 202 onboards each digital content partner 204A-N and each CSP 206A-N. The onboarding process may be provided via one or more self-service interfaces of the platform 202. The interfaces may differ for the digital content partners 204A-N and CSPs 206A-N (e.g. due to different required information). As a result of the onboarding, an organization may be created in a multi-tenant database system for each digital content partner 204A-N and each CSP 206A-N.

Further, the platform 202 may store information associated with integrations between the digital content partners 204A-N and the CSPs 206A-N. For example, the information may include approved agreements between the digital content partners 204A-N and the CSPs 206A-N. An approved agreement between a digital content partner 204A-N and a CSP 206A-N may refer to an agreement accepted by both the digital content partner 204A-N and the CSP 206A-N for an integration (i.e. that the digital content partner 204A-N will provide a digital service to a consumer while the CSP 206A-N will provide direct carrier billing to the consumer for the digital service). The information stored by the platform 202 may also optionally include settlement rules for each approved agreement, indicating rules by which the CSP 206A-N settles payments due to the digital content partner 204A-N for the digital service billed to the consumer by the CSP 206A-N.

Still yet, the platform 202 manages service provisioning for each integration. In one embodiment, the platform 202 manages the service provisioning by receiving digital service transactions from the digital content partner 204A-N, and further communicating those digital service transactions to the CSP 206A-N for billing purposes. As noted above, the communications between the platform 202 and the digital content partner 204A-N/CSP 206A-N may be provided via the APIs of the platform 202, which may be secured.

In one exemplary implementation of the system 200 for a platform managed consumer subscription, a digital content partner 204A-N and a CSP 206A-N create an agreement for distribution of content of the digital content partner 204A-N, and the agreement is defined in the platform 202. The digital content partner 204A-N integrates (onboards) to the platform 202. The digital content partner 204A-N can now be offered to customers (consumers) of any CSP supported by the platform 202.

In one use case, a customer logs in to an application or portal of the platform 200, and the platform 200 provides a product catalog and billing plan services to the customer. The customer browses through services to purchase, and selects a digital service of the onboarded digital content partner 204A-N. The customer is notified that he will start a new billing date today and will be billed a defined amount for the digital service. The customer confirms the purchase. Upon confirmation, the platform 200 receives the subscription request and processes the charges. Upon successful transaction processing, the platform 200 provisions the subscription to the digital service along with a unique redemption code or Quick Response (QR) code. The customer is sent a redemption code to be used on the digital service (after registration or login). The platform 200 sends the transaction to the CSP 206A-N to add on the bill. The platform 200 produces a periodic transaction extract for CSP 206A-N and digital content partner 204A-N to settle.

In another exemplary implementation of the system 200 for a digital content partner managed consumer subscription, a digital content partner 204A-N and a CSP 206A-N create an agreement for distribution of content of the digital content partner 204A-N, and the agreement is defined in the platform 202. The digital content partner 204A-N integrates (onboards) to the platform 202. The digital content partner 204A-N can offer direct carrier billing to the customer for any CSP 206A-N that is integrated (onboarded) to the platform 200.

An end user enters launches an application of the digital content partner 204A-N, selects a subscription plan, and chooses to "Pay on Bill" for the service. The end user enters his mobile phone number. The platform 200 validates the user in the CSP 206A-N billing system. If the validation is a success, the application can request the platform 200 to generate, send and validate a personal identification number (PIN) that can be used as purchase confirmation. The digital content partner 204A-N sends the charges to the platform 200 to process the transaction. The platform 200 sends the transaction to the CSP 206A-N to add on the bill. The platform 200 settles any end-of-cycle (monthly) revenue share fees between the CSP 206A-N and the digital content partner 204A-N.

Figure 3:
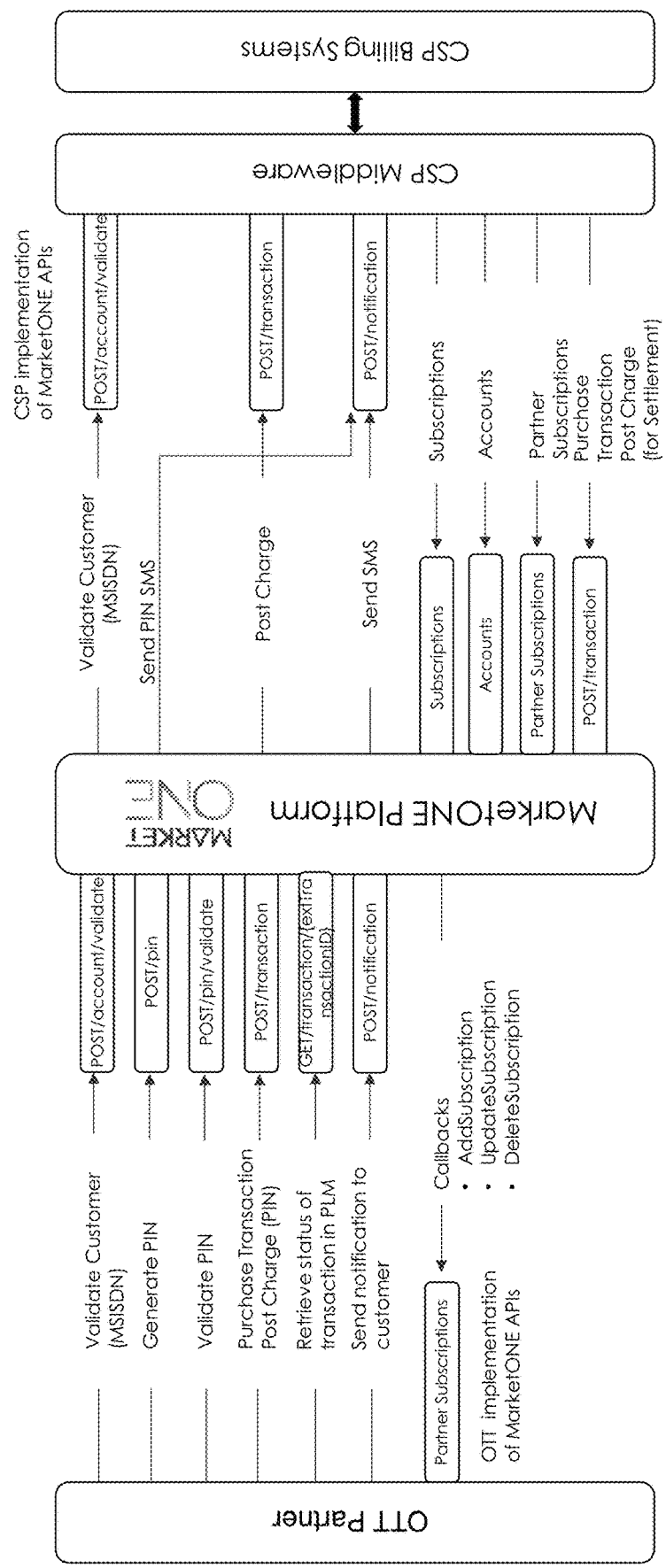
FIG. 3 illustrates the application programming interface (API) communication flow for a platform managed consumer subscription, in accordance with one embodiment.

FIG. 3 illustrates the API communication flow 300 for a platform managed consumer subscription, in accordance with one embodiment. The API communication flow 300 may be implemented in the context of the details of the previous figure and/or any subsequent figure(s). For example, the API communication flow 300 may be implemented in the context of the system 200 of FIG. 2. Further, the aforementioned definitions may equally apply to the description below.

As shown, the platform ("MarketOne Platform") communicates with an OTT provider (also referred to as an OTT partner herein) and CSP systems, such as CSP Billing systems (via CSP Middleware) using a plurality of APIs of the platform, OTT provider, and CSP Middleware. The OTT provider sends a validate customer request to the platform using a POST/account/validate API of the platform. In response to the request, the platform sends the validate customer request to the CSP Middleware via a POST/account/validate API of the CSP Middleware.

The OTT provider sends a generate PIN request to the platform using a POST/pin API of the platform. In response to the request, the platform sends to the CSP Middleware a request for a PIN short message service (SMS) message to be sent to the customer, using a POST/notification API of the CSP Middleware. The OTT provider sends a validate PIN notification to the platform using a POST/pin/validate API of the platform.

The OTT provider sends a purchase transaction post charge with the PIN to the platform, using POST/transaction API of the platform. In response, the platform forwards the post charge to the CSP Middleware using a POST/notification API of the CSP Middleware. The OTT provider sends to the platform a request to retrieve a status of the transaction in product lifecycle management (PLM), using a GET/transaction/{extTransactionID} API of the platform.

The OTT provider sends to the platform a request to send a notification to the customer using a POST/notification API of the platform. In response, the platform requests the CSP Middleware to send an SMS to the customer, using the POST/notification API of the CSP Middleware.

The platform receives from the CSP Middleware subscriptions, accounts, partner subscriptions, and purchase transaction post charges (for settlement) using, respectively, a subscriptions API of the platform, an accounts API of the platform, a partner subscriptions API of the platform, and a POST/transaction API of the platform. The platform sends callbacks (e.g. add subscription, update subscription, delete subscription) to the OTT provider using a partner subscriptions API of the OTT provider.

Figure 4:
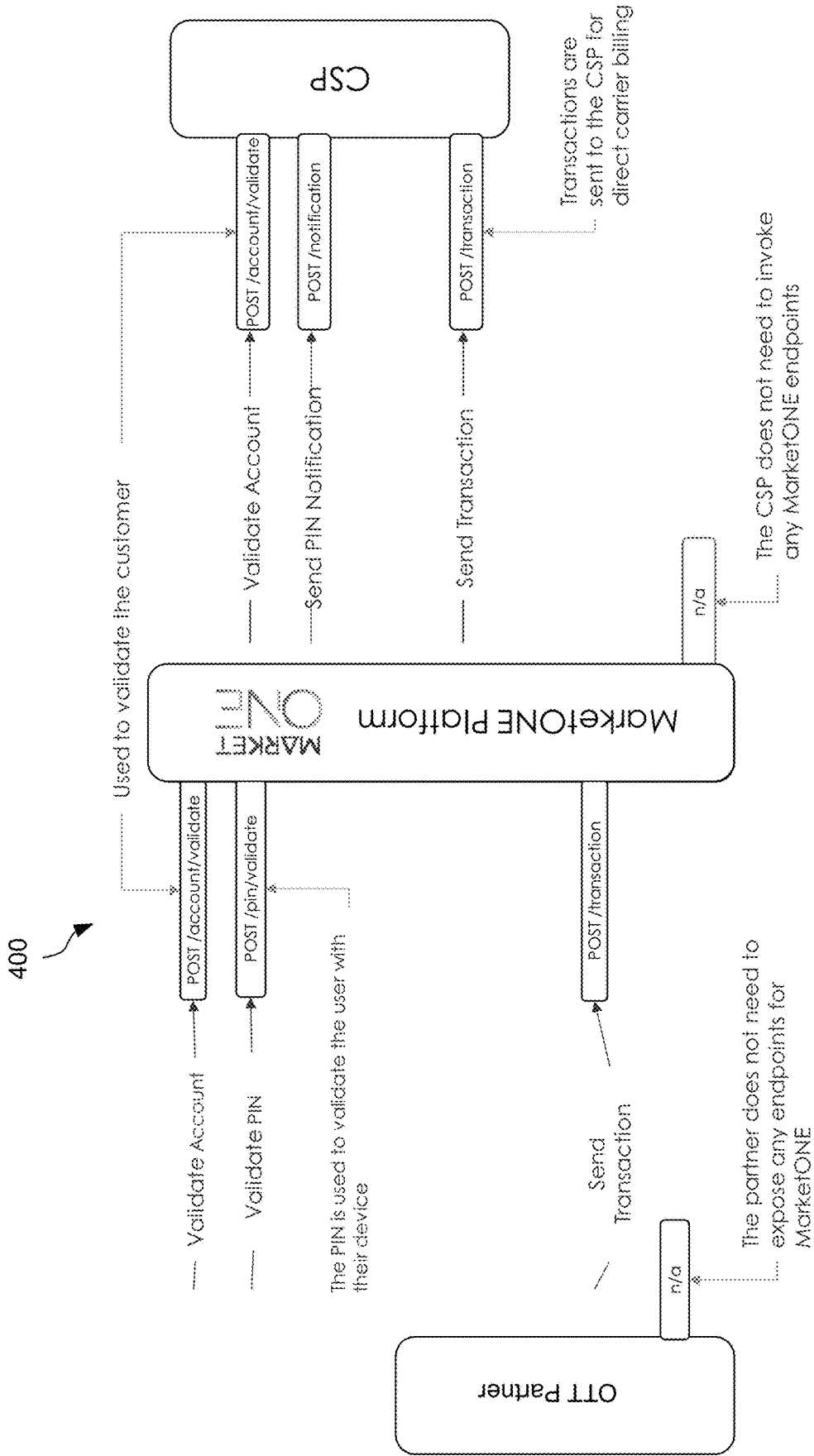
FIG. 4 illustrates the API communication flow for a digital content partner managed consumer subscription, in accordance with one embodiment.

FIG. 4 illustrates the API communication flow 400 for a digital content partner managed consumer subscription, in accordance with one embodiment. The API communication flow 400 may be implemented in the context of the details of the previous figure and/or any subsequent figure(s). For example, the API communication flow 400 may be implemented in the context of the system 200 of FIG. 2. Further, the aforementioned definitions may equally apply to the description below.

As shown, the digital content partner ("OTT Partner") does not require any APIs configured for the API communication flow 400 of the present embodiment. However, the platform ("MarketOne Platform") includes a Validate Account API, which receives user account information from the digital content partner. The CSP also includes a Validate Account API, which is used by the platform to request validation of the user account information from the CSP, and in response the platform receives account details and creates an account. Additionally, the CSP includes a Send Pin Notification API that is used by the platform to sends a PIN to the customer via the CSP.

Further, the platform includes a Validate PIN API, whereby the PIN, when entered on the digital content partner application by the customer, is validated by the platform. Still yet, the platform includes a Send Transaction API through which the digital content partner sends customer transactions with the digital service to the platform for posting. The CSP includes a Send Transaction API as well through which the platform forwards the customer transactions to the CSP for direct carrier billing.

In an exemplary implementation of the API communication flow 400, a purchase is initiated through the digital content partner by a user. The user selects direct carrier billing on the digital content partner application, and enters his mobile or account number for validation, which is sent to the platform via the Validate Account API of the platform. The platform requests validation of the account from the CSP via the Validate Account API of the CSP, and in response receives account details for the user and then creates an account for the user on the platform.

The platform then sends a PIN to the user via Send Pin Notification API of the CSP. After, the PIN entered on the digital content partner app is sent to the platform via the Validate PIN API for validation. Once validated, the digital content partner sends the purchase transaction to the platform via the Send Transaction API of the platform for posting. The platform then sends the purchase transaction to the CSP for direct carrier billing via the Send Transaction API of the CSP.

Figure 5:
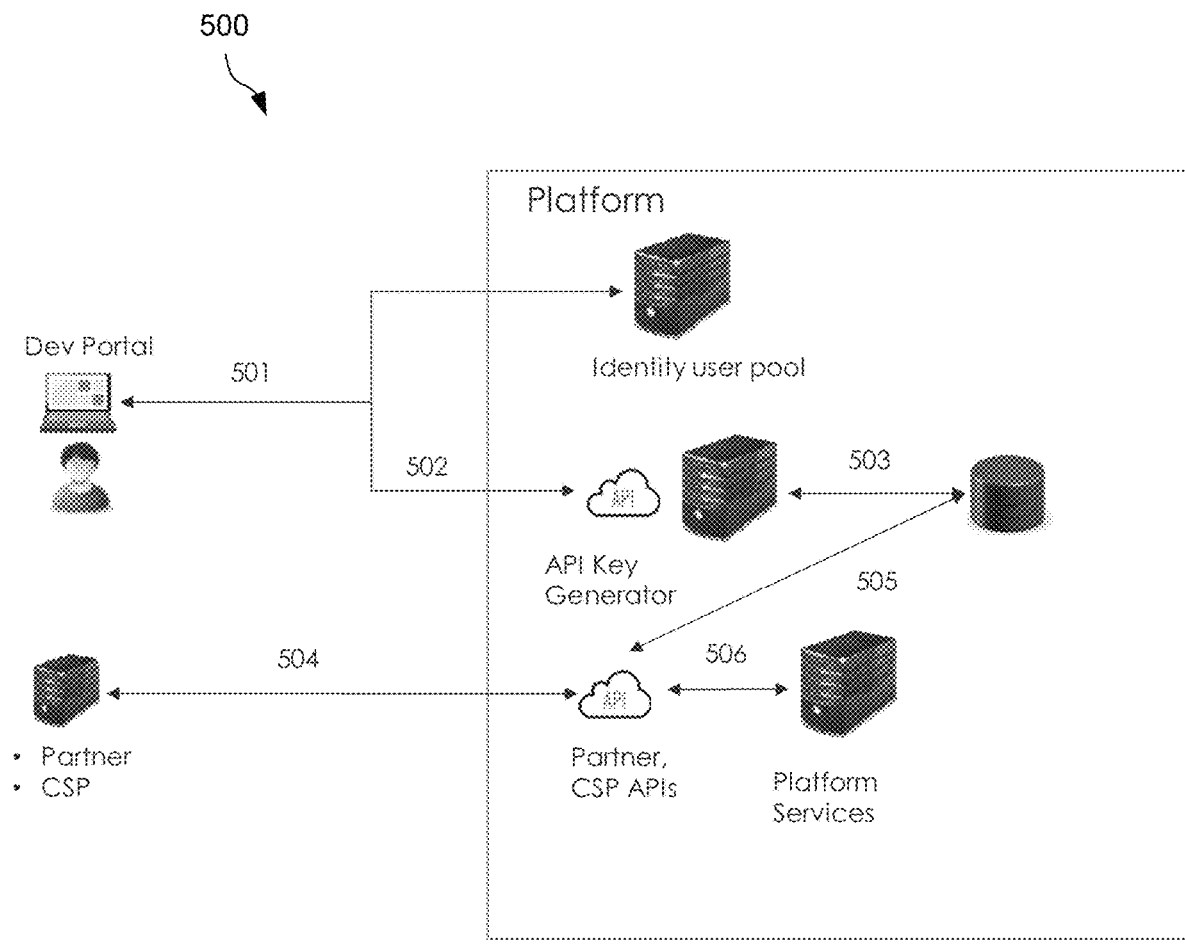
FIG. 5 illustrates an API key security flow employed by the platform of FIG. 2, in accordance with one embodiment.

FIG. 5 illustrates an API key security flow 500 employed by the platform of FIG. 2, in accordance with one embodiment.

As shown in operation 501, a development portal ("Dev Portal") receives an identity token from the platform user pool after successful authentication. In operation 502, the development portal makes an API call to receive an API key for the specific CSP or digital content partner/CSP combination. The CSP and digital content partner API keys are different and used to orchestrate different flows. In operation 503, the platform API keys are persisted.

In operation 504, the API keys are used to call platform APIs. In operation 505, the platform API Gateway validates the API Key and its signature. In operation 506, the platform Integration Gateway allows or denies access to APIs as appropriate.

In one embodiment, each API Key may be encrypted and signed with a platform certificate. The platform may persist API Key hashes, where each API Key is hashed using a bcrypt algorithm. Digital content partners may get a different API Key for each CSP with which they have agreements. Further, CSPs may get a single key for the platform. In this case, there may be only one valid API Key for a CSP or a digital content partner/CSP combination at any particular time. If that key is regenerated, the old key will become invalid.

In one exemplary embodiment, the platform generates a digital content partner API key for the digital content partner. The digital content partner API key is used by the platform to orchestrate flows associated with the digital content partner. The platform also generates a CSP API key for the CSP. The CSP API key is used by the platform to orchestrate flows associated with the CSP. Additionally, the platform persists the digital content partner API key and the CSP API key.

Further with respect to the exemplary embodiment, the digital content partner uses the digital content partner API key to call APIs of the platform and the CSP uses the CSP API key to call the APIs of the platform. Responsive to a call from the digital content partner to one of the APIs of the platform, the platform validates the digital content partner API key used to make the call. Responsive to validating the digital content partner API key, the platform allows access by the digital content partner to the called one of the APIs of the platform. Similarly, responsive to a call from the CSP to one of the APIs of the platform, the platform validates the CSP API key used to make the call. Then, responsive to validating the CSP API key, the platform allows access by the CSP to the called one of the APIs of the platform.

Figure 6:
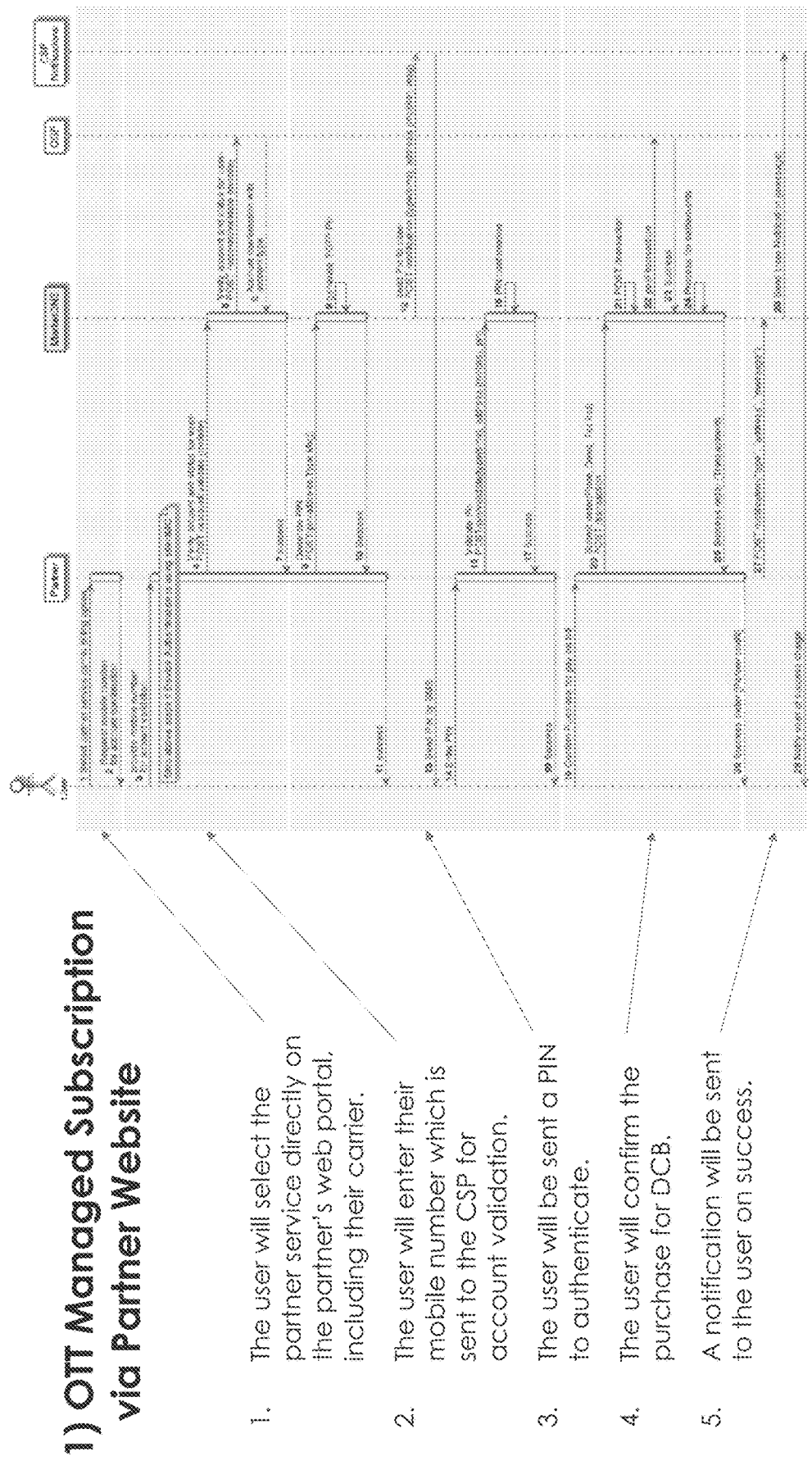
FIG. 6 illustrates a system flow for an over-the-top managed subscription via a digital content partner website, in accordance with one embodiment.

FIG. 6 illustrates a system flow for an over-the-top (OTT) managed subscription via a digital content partner website, in accordance with one embodiment. In the embodiment shown, MarketOne refers to the platform described above.

As shown, (1) the user will select the digital content partner service directly on the partner's web portal, including their carrier (CSP). (2) The user will enter their mobile number which is sent to the CSP for account validation. (3) The user will be sent a PIN to authenticate. (4) The user will confirm the purchase for direct carrier billing (DCB). (5) A notification will be sent to the user on success.

Figure 7A:
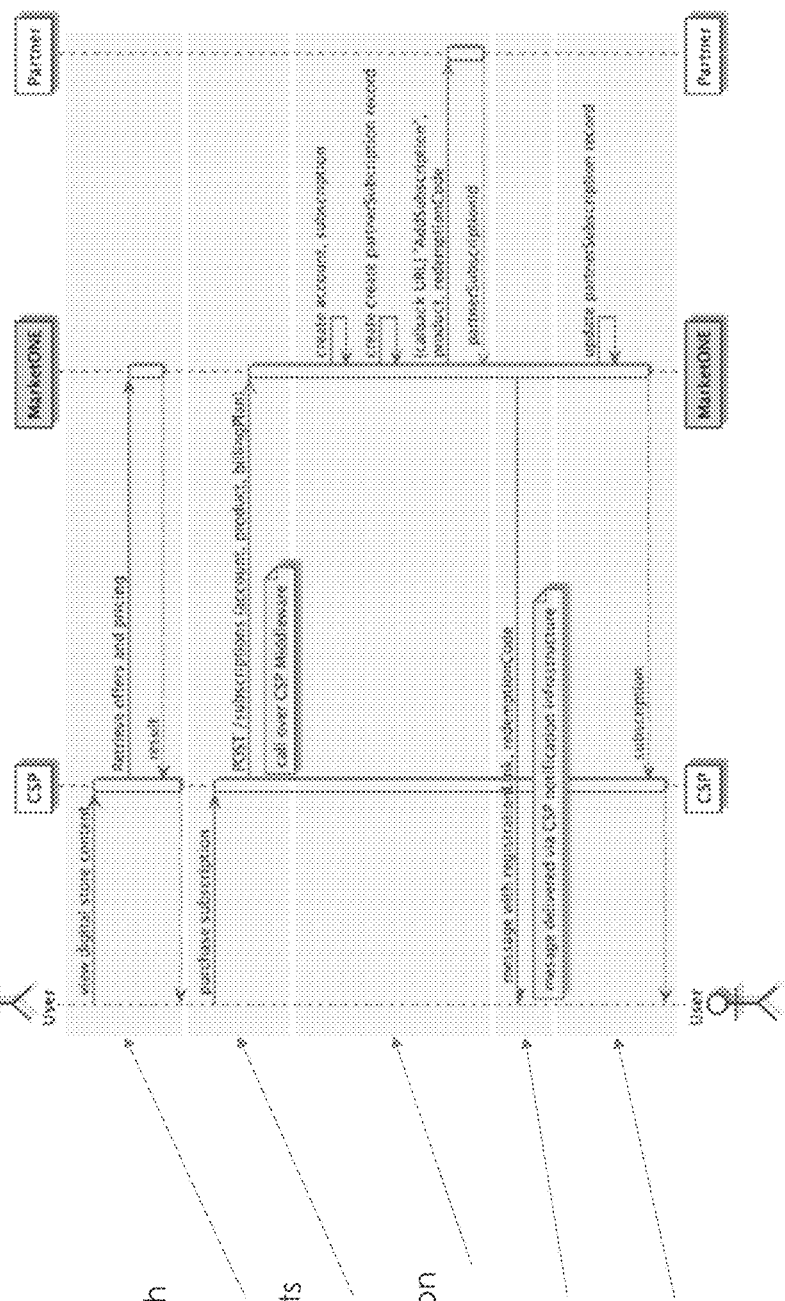
FIGS. 7A-B illustrate a system flow for a platform (MarketOne) managed subscription via a CSP website, in accordance with one embodiment.
Figure 7B:
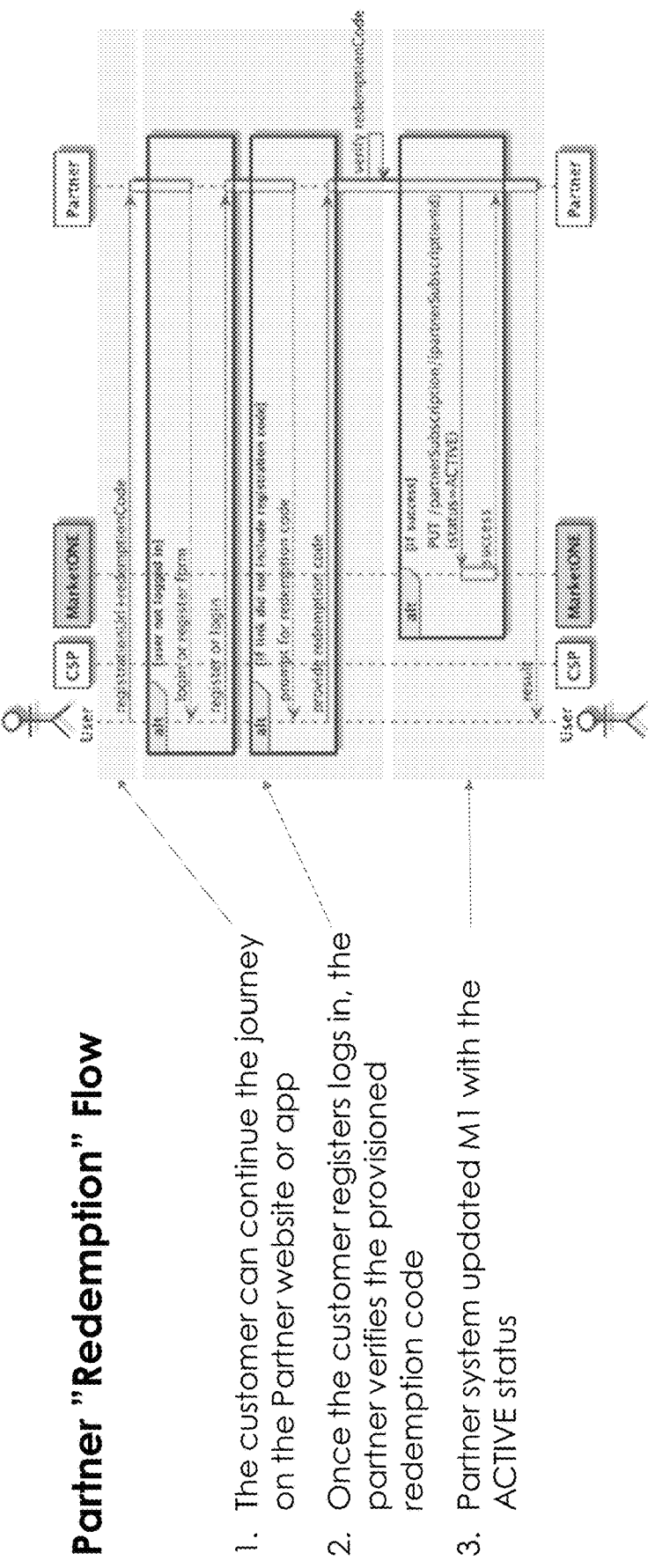

FIGS. 7A-B illustrate a system flow for a platform managed subscription via a CSP website, in accordance with one embodiment. In the embodiment shown, MarketOne refers to the platform described above, and accordingly the platform managed subscription may also be referred to as a MarketOne managed subscription.

As shown in FIG. 7A, (1) the user authenticates with their CSP. (2) The user chooses the partner service and submits their order with DCB. (3) The subscription is sent to the partner with redemption code. (4) The user receives a registration link to the partner service. (5) The Partner subscription is updated in MarketOne.

As shown in FIG. 7B, a partner "redemption" flow includes (1) the customer can continue the journey on the Partner website or app. (2) Once the customer registers and logs in, the partner verifies the provisioned redemption code. (3) The partner system updates MarketOne with the ACTIVE status.

Figure 8:
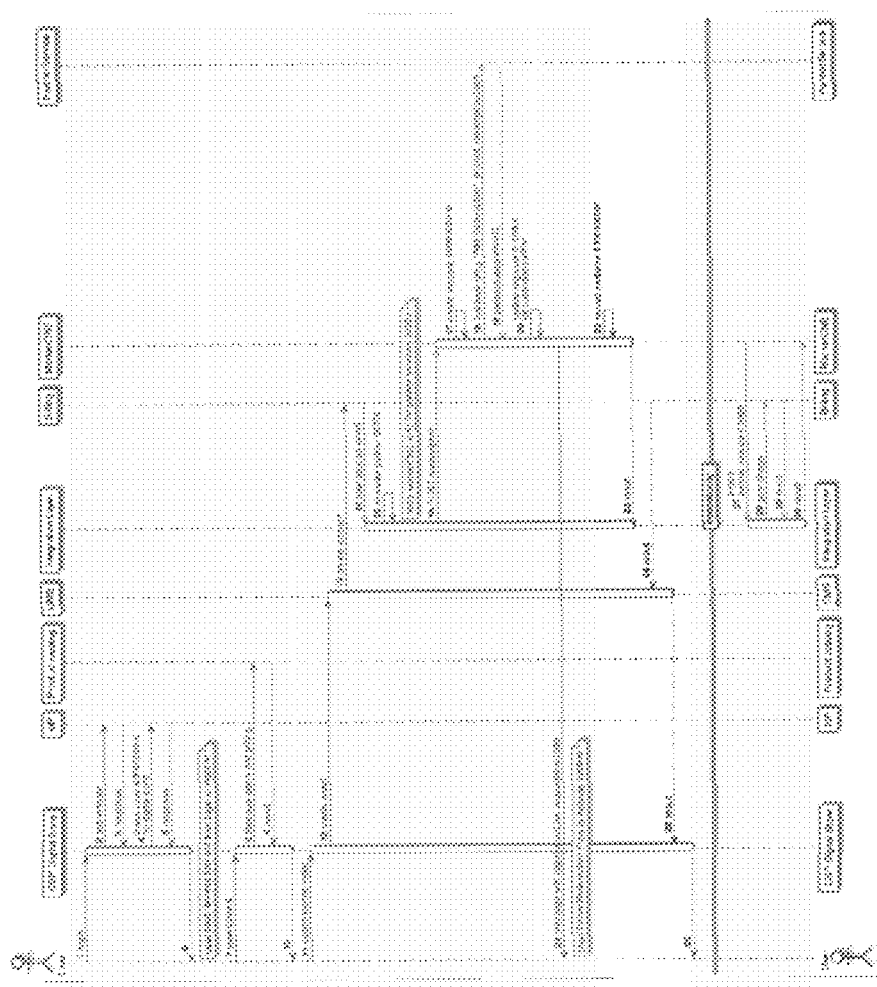
FIG. 8 illustrates a system flow for a platform (MarketOne) managed subscription, in accordance with one embodiment.

FIG. 8 illustrates a system flow for a platform managed subscription, in accordance with one embodiment. In the embodiment shown, MarketOne refers to the platform described above, and accordingly the platform managed subscription may also be referred to as a MarketOne managed subscription.

As shown, (1) the user authenticates with their CSP. (2) The user views available subscriptions from CSP ordering. (3) The user chooses a bundle and submits; Office Master System (OMS) provisions to MarketOne; and the subscription is sent to the partner with redemption code. (4) The user receives a registration link to the partner service. (5) Monthly transaction processing is performed.

FIG. 9 illustrates a system flow for cancelling a platform managed subscription, in accordance with one embodiment. In the embodiment shown, MarketOne refers to the platform described above, and accordingly the platform managed subscription may also be referred to as a MarketOne managed subscription.

As shown, (1) the customer will access the CSP website to cancel the subscription. (2) MarketONE triggers a "DeleteSubscription" callback and updates the MarketONE record. (3) A confirmation message is sent to the customer. In one embodiment, the subscription will only be cancelled at the end of the current cycle. In another embodiment, subscriptions can also be cancelled via the customer service representative (CSR).

Figure 10:
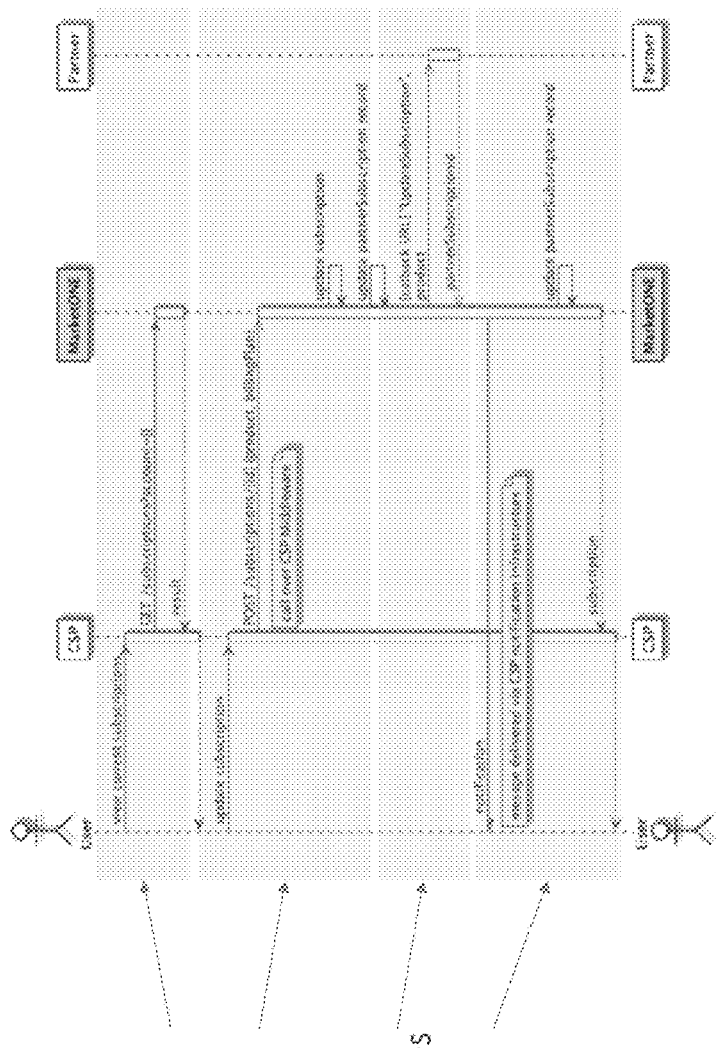
FIG. 10 illustrates a system flow for updating a platform (MarketOne) managed subscription, in accordance with one embodiment.

FIG. 10 illustrates a system flow for updating a platform managed subscription, in accordance with one embodiment. In the embodiment shown, MarketOne refers to the platform described above, and accordingly the platform managed subscription may also be referred to as a MarketOne managed subscription.

As shown, (1) the user accesses the CSP website/app and sees current subscriptions. (2) The user updates a subscription (e.g. upgrade). (3) "UpdateSubscription" callbacks from MarketONE for upgrades and downgrades. (4) The user is notified of the change.

Figure 11:
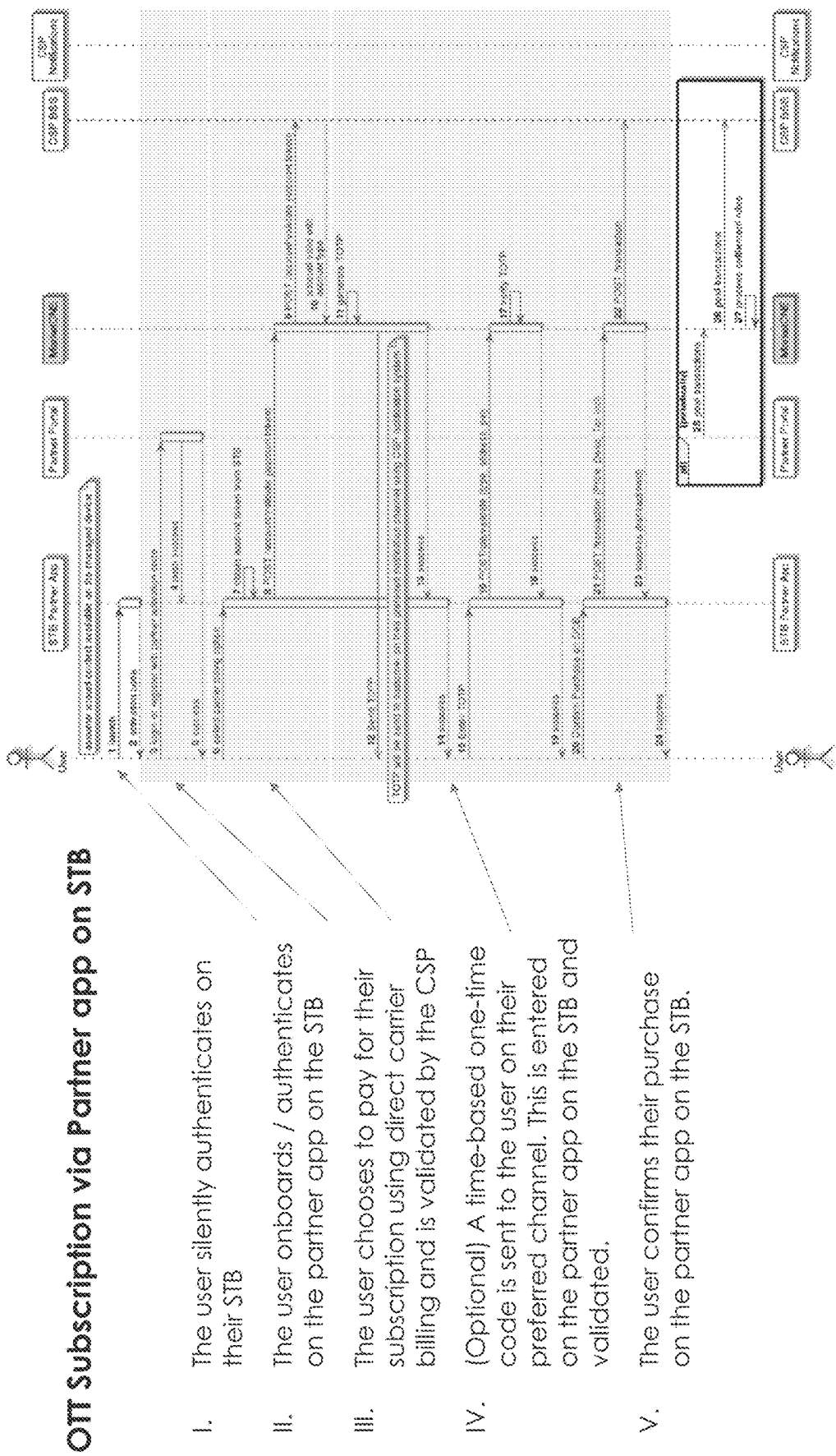
FIG. 11 illustrates a system flow for an over-the-top (OTT) managed subscription via a digital content partner application on a set top box, in accordance with one embodiment.

FIG. 11 illustrates a system flow for an over-the-top (OTT) managed subscription via a digital content partner application on a set top box (STB), in accordance with one embodiment. In the embodiment shown, MarketOne refers to the platform described above.

As shown, (1) the user silently authenticates on their STB. (2) The user onboards/authenticates on the partner app on the STB. (3) The user chooses to pay for their subscription using direct carrier billing and is validated by the CSP. (4) (Optional) A time-based one-time code is sent to the user on their preferred channel. This is entered on the partner app on the STB and validated. (5) The user confirms their purchase on the partner app on the STB.

Figure 12:
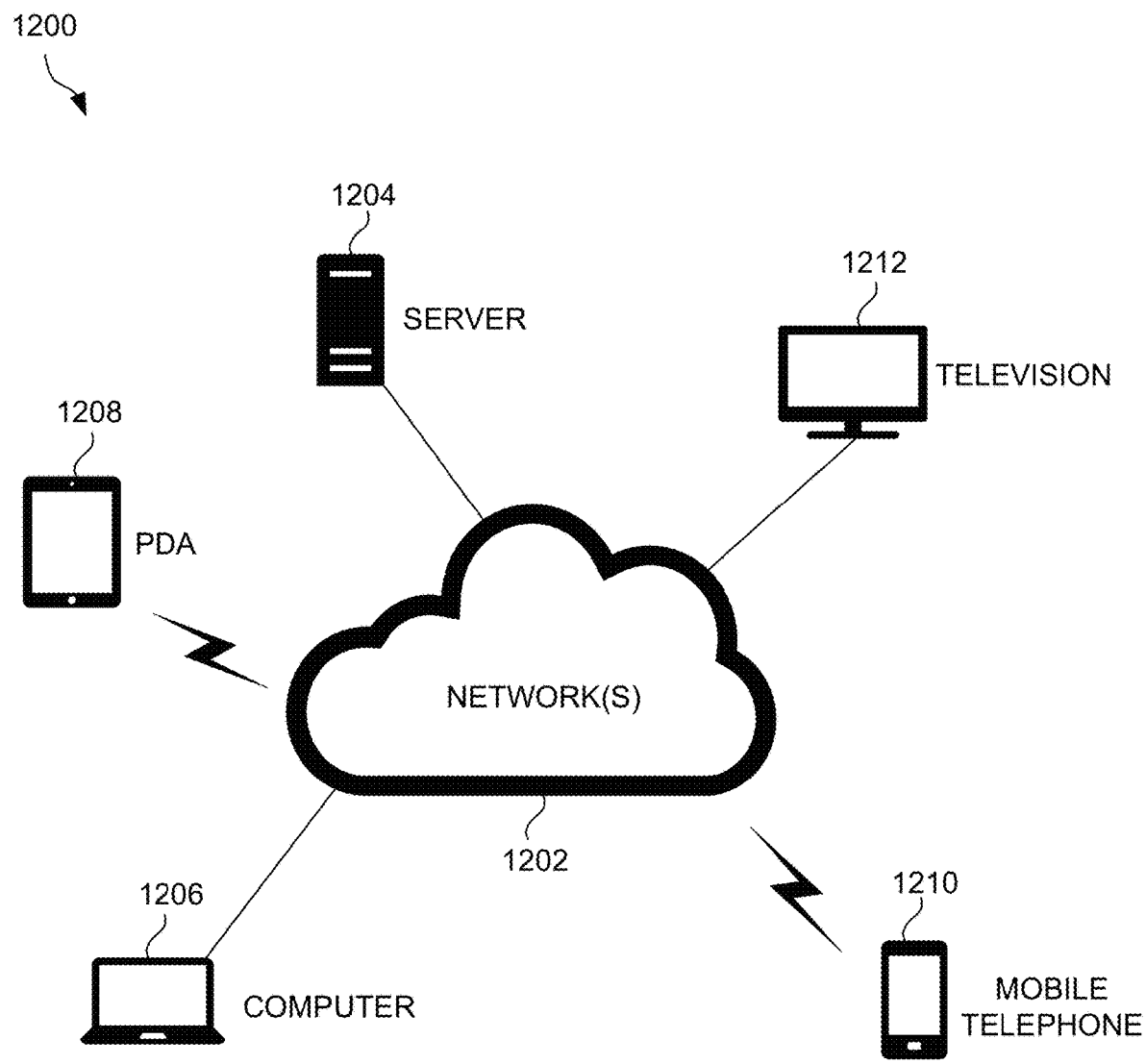
FIG. 12 illustrates a network architecture, in accordance with one possible embodiment.

FIG. 12 illustrates a network architecture 1200, in accordance with one possible embodiment. As shown, at least one network 1202 is provided. In the context of the present network architecture 1200, the network 1202 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1202 may be provided.

Coupled to the network 1202 is a plurality of devices. For example, a server computer 1204 and an end user computer 1206 may be coupled to the network 1202 for communication purposes. Such end user computer 1206 may include a desktop computer, lap-top computer, and/or any other type of logic. Still yet, various other devices may be coupled to the network 1202 including a personal digital assistant (PDA) device 1208, a mobile phone device 1210, a television 1212, etc.

Figure 13:
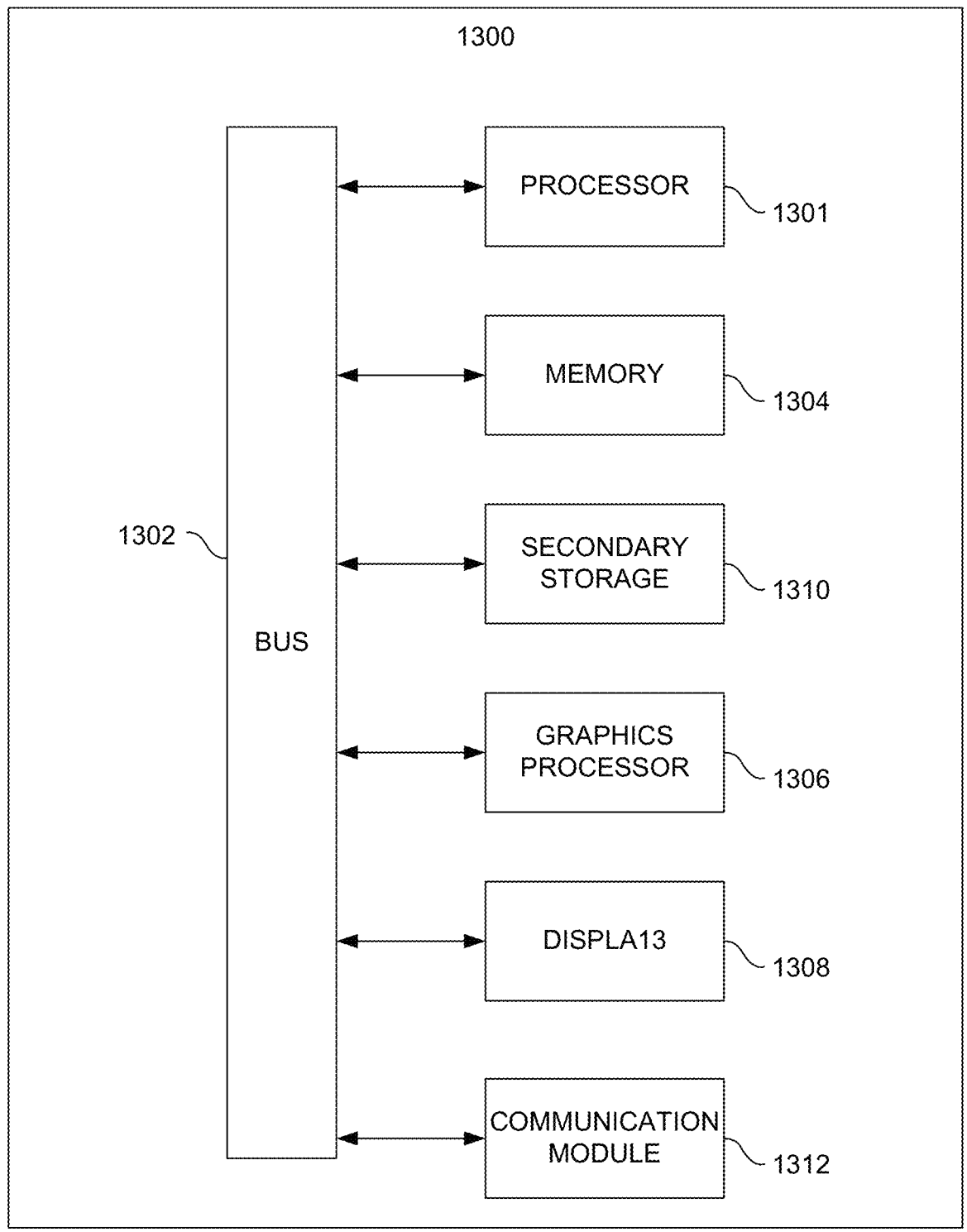
FIG. 13 illustrates an exemplary system, in accordance with one embodiment.

FIG. 13 illustrates an exemplary system 1300, in accordance with one embodiment. As an option, the system 1300 may be implemented in the context of any of the devices of the network architecture 1200 of FIG. 12. Of course, the system 1300 may be implemented in any desired environment.

As shown, a system 1300 is provided including at least one central processor 1301 which is connected to a communication bus 1302. The system 1300 also includes main memory 1304 [e.g. random access memory (RAM), etc.]. The system 1300 also includes a graphics processor 1306 and a display 1308.

The system 1300 may also include a secondary storage 1310. The secondary storage 1310 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1304, the secondary storage 1310, and/or any other memory, for that matter. Such computer programs, when executed, enable the system 1300 to perform various functions (as set forth above, for example). Memory 1304, storage 1310 and/or any other storage are possible examples of non-transitory computer-readable media.

The system 1300 may also include one or more communication modules 1312. The communication module 1312 may be operable to facilitate communication between the system 1300 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   onboarding a digital content partner to a platform by at least creating a first account for the digital content partner with the platform;
   onboarding a communication service provider (CSP) to the platform by at least creating a second account for the CSP with the platform;
   managing, by the platform, service provisioning for an integration of the CSP and the digital content partner;
   generating, by the platform, a digital content partner application programming interface (API) key for the digital content partner, wherein the digital content partner API key is used by the platform to orchestrate flows associated with the digital content partner; and
   generating, by the platform, a CSP API key for the CSP, wherein the CSP API key is used by the platform to orchestrate flows associated with the CSP.

2. The non-transitory computer readable medium of claim 1, wherein the digital content partner provides at least one digital service to consumers.

3. The non-transitory computer readable medium of claim 1, wherein the digital content partner is onboarded to the platform further by:
   creating a digital content partner organization in a multi-tenant database system,
   creating a catalog of digital services provided by the digital content partner, and
   storing information associated with an approved agreement between the digital content partner and the CSP.

4. The non-transitory computer readable medium of claim 1, wherein the CSP provides a communication network for use by consumers.

5. The non-transitory computer readable medium of claim 1, wherein the CSP is onboarded to the platform further by:
   creating a CSP organization in a multi-tenant database system,
   creating partnership models,
   creating settlement models,
   creating agreements,
   storing information associated with an approved agreement between the CSP and the digital content partner;
   creating settlement rules for digital services provided by the digital content partner.

6. The non-transitory computer readable medium of claim 1, wherein the digital content partner and the CSP are onboarded to the platform using self-service user interfaces provided by the platform.

7. The non-transitory computer readable medium of claim 1, wherein managing the service provisioning for the integration of the CSP and the digital content partner includes managing the service provisioning in association with a digital content partner managed consumer subscription.

8. The non-transitory computer readable medium of claim 7, wherein the digital content partner managed consumer subscription includes a subscription of a consumer to a digital service of the digital content partner made directly through an interface of the digital content partner.

9. The non-transitory computer readable medium of claim 8, wherein the subscription includes a consumer selection of the CSP to be used for direct carrier billing.

10. The non-transitory computer readable medium of claim 9, wherein managing the service provisioning in association with the digital content partner managed consumer subscription includes:
receiving, at the platform, transactions of the consumer with the digital content partner in association with the subscription, and
submitting, by the platform, the transactions to the CSP for the direct carrier billing by the CSP.

11. The non-transitory computer readable medium of claim 1, wherein managing the service provisioning for the integration of the CSP and the digital content partner includes managing the service provisioning in association with a platform managed consumer subscription.

12. The non-transitory computer readable medium of claim 11, wherein the platform managed consumer subscription includes a subscription of a consumer to a digital service of the digital content partner made through an interface of the CSP.

13. The non-transitory computer readable medium of claim 12, wherein managing the service provisioning in association with the platform managed consumer subscription includes:
providing to the digital content partner a redemption code associated with the subscription, wherein the digital content partner uses the redemption code to verify the subscription, and
submitting, by the platform to the CSP for direct carrier billing, transactions of the consumer with the digital service.

14. The non-transitory computer readable medium of claim 1, wherein the platform persists the digital content partner API key and the CSP API key.

15. The non-transitory computer readable medium of claim 1, wherein the digital content partner uses the digital content partner API key to call APIs of the platform and the CSP uses the CSP API key to call the APIs of the platform.

16. The non-transitory computer readable medium of claim 15, wherein:
responsive to a call from the digital content partner to one of the APIs of the platform, the platform validates the digital content partner API key used to make the call; and
responsive to validating the digital content partner API key, the platform allows access by the digital content partner to the called one of the APIs of the platform.

17. The non-transitory computer readable medium of claim 15, wherein:
responsive to a call from the CSP to one of the APIs of the platform, the platform validates the CSP API key used to make the call; and
responsive to validating the CSP API key, the platform allows access by the CSP to the called one of the APIs of the platform.

18. A method, comprising:
onboarding a digital content partner to a platform by at least creating a first account for the digital content partner with the platform;
onboarding a communication service provider (CSP) to the platform by at least creating a second account for the CSP with the platform;
managing, by the platform, service provisioning for an integration of the CSP and the digital content partner;
generating, by the platform, a digital content partner application programming interface (API) key for the digital content partner, wherein the digital content partner API key is used by the platform to orchestrate flows associated with the digital content partner; and
generating, by the platform, a CSP API key for the CSP, wherein the CSP API key is used by the platform to orchestrate flows associated with the CSP.

19. A system, comprising:
a non-transitory memory storing instructions; and
one or more processors in communication with the non-transitory memory that execute the instructions to perform a method comprising:
onboarding a digital content partner to a platform;
onboarding a communication service provider (CSP) to the platform;
managing, by the platform, service provisioning for an integration of the CSP and the digital content partner, including:
managing the service provisioning in association with a digital content partner managed consumer subscription,
wherein the digital content partner managed consumer subscription includes a subscription of a consumer to a digital service of the digital content partner made directly through an interface of the digital content partner, and
wherein the subscription includes a consumer selection of the CSP to be used for direct carrier billing.

* * * * *